Aug. 24, 1943.   R. H. TOUBHANS   2,327,944
APPARATUS FOR MACHINING SERRATIONS IN METALLIC BODIES
Filed Dec. 19, 1941   2 Sheets-Sheet 1
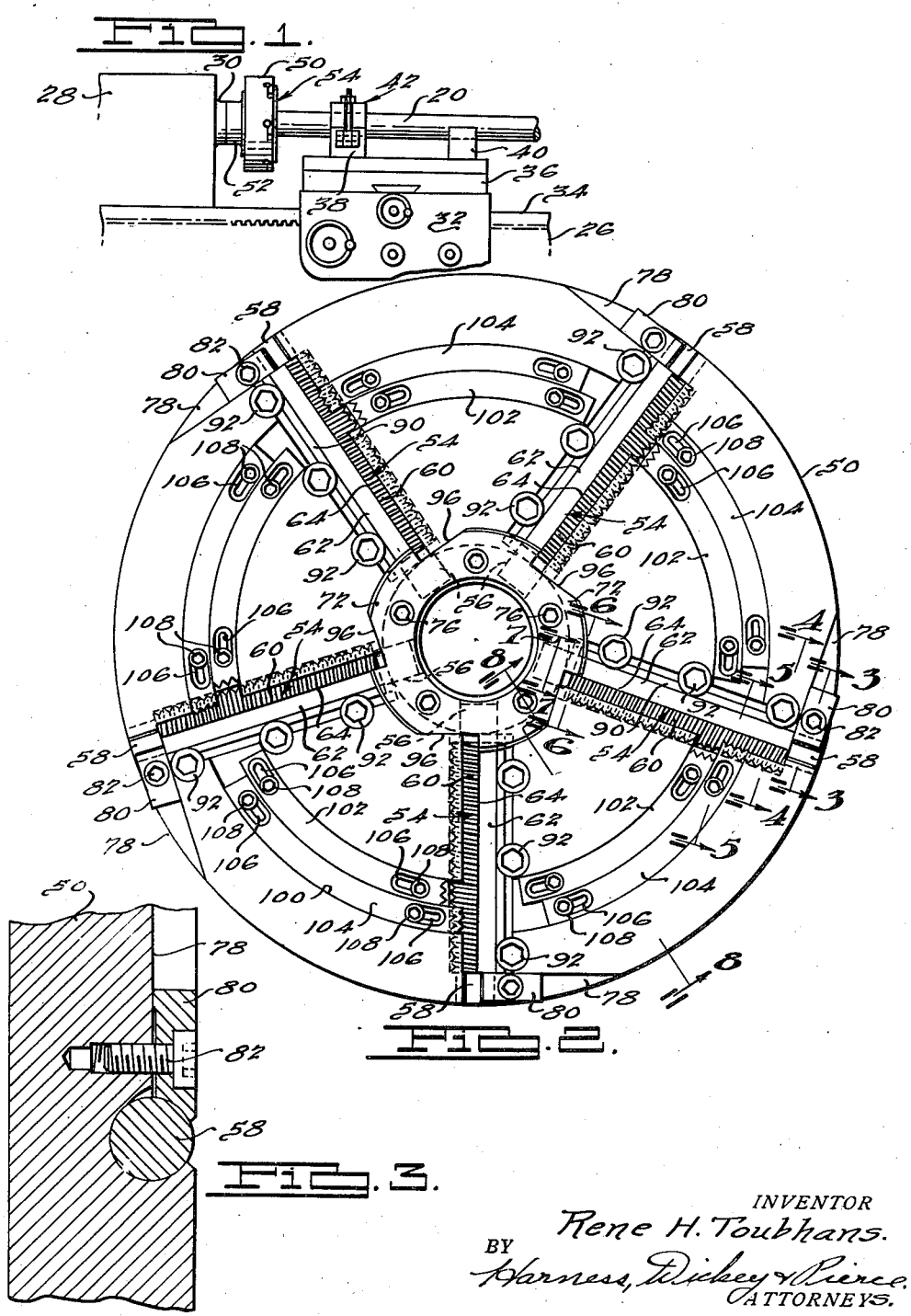
INVENTOR
Rene H. Toubhans.
BY
Harness, Dickey & Pierce.
ATTORNEYS.

Aug. 24, 1943. R. H. TOUBHANS 2,327,944
APPARATUS FOR MACHINING SERRATIONS IN METALLIC BODIES
Filed Dec. 19, 1941 2 Sheets-Sheet 2
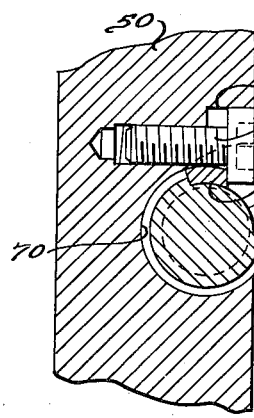
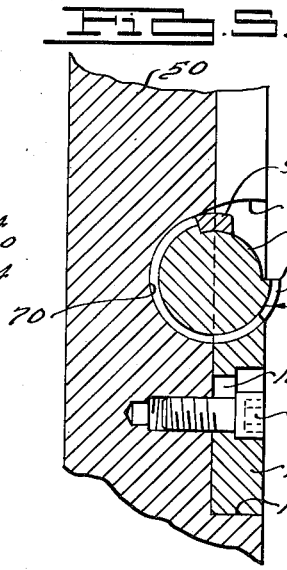
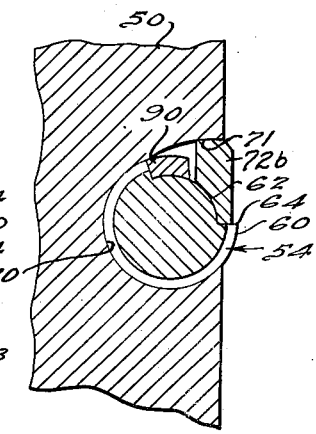
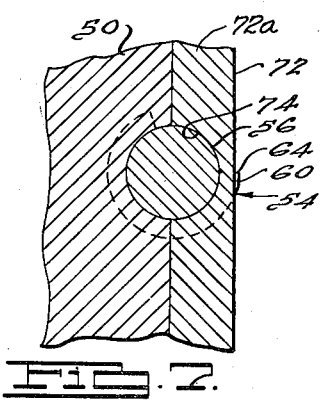
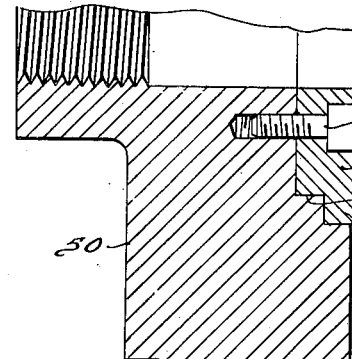
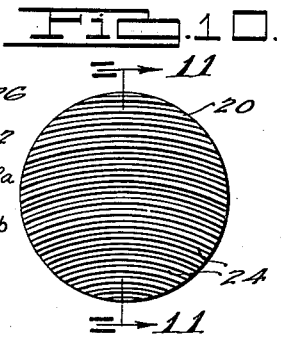
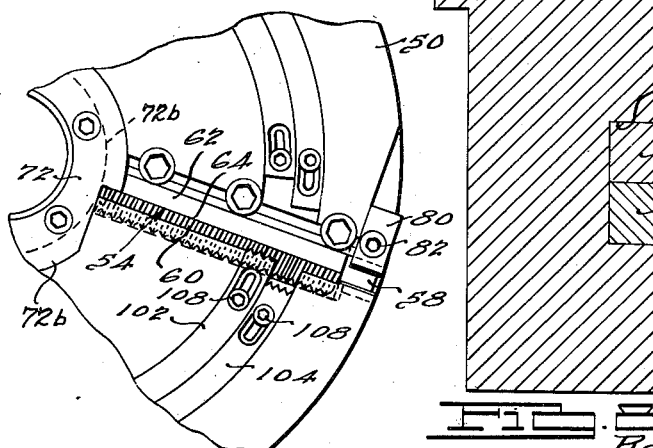
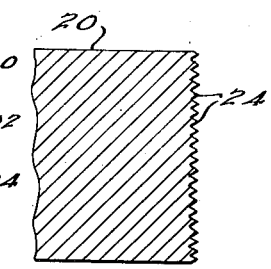
INVENTOR
Rene H. Toubhans.
BY
Harness, Dickey & Pierce.
ATTORNEYS.

Patented Aug. 24, 1943

2,327,944

UNITED STATES PATENT OFFICE 2,327,944

APPARATUS FOR MACHINING SERRATIONS IN METALLIC BODIES

René H. Toubhans, Dearborn, Mich., assignor to Century Motors Corporation, Dearborn, Mich., a corporation of Michigan Application December 19, 1941, Serial No. 423,641

13 Claims. (Cl. 29—105)

This invention relates to mechanism for machining serrations in metallic bodies and has for its principal object the provision of a cutter head for this purpose involving a novel type of cutting tool providing an exceptionally long life thereto.

Objects of the invention include the provision of a cutter head for use in machining curved serrations in metallic bodies including a head and a plurality of cutter blades disposed at generally radial relation with respect thereto, the cutter blades each comprising a cylindrical element having a grooved or ribbed periphery and cut away over its length for a portion of its periphery to present a serrated cutting edge; the provision of a cutting tool of the type described in which the cutting elements or blades are provided with thread-like grooves in their periphery; the provision of a cutting tool of the type described including novel means for locating the cutter elements or blades radially of the supporting head therefor; the provision of a cutter head of the type described including novel means for securing the cutting elements for blades in position in the head; and the provision of a tool of the type described that is sturdy in construction and long lived.

The above being among the objects of the present invention the same consists in certain novel features of construction and combinations of parts to be hereinafter described with reference to the accompanying drawings, and then claimed, having the above and other objects in view.

In the accompanying drawings which illustrate a suitable embodiment of the present invention and in which like numerals refer to like parts throughout the several different views, Fig. 1 is a fragmentary, side elevational view showing the cutter head constructed in accordance with the present invention mounted upon the spindle of a lathe in operative relationship with respect to a piece of work;

Fig. 2 is an enlarged view of the operating face of the cutter head shown in Fig. 1;

Figs. 3 to 8, inclusive, are enlarged fragmentary sectional views taken on the lines 3—3; 4—4; 5—5; 6—6; 7—7, and 8—8, respectively, of Fig. 2;

Fig. 9 is a reduced fragmentary view of the operative face of the cutter head shown in the preceding views illustrating the manner in which the cutter blades are locked in radially adjusted position and with the cutter blades radially shifted from the position shown in the preceding figures;

Fig. 10 is an end view of the piece of work shown in Fig. 1 after its end face has been serrated by the cutter head of the present invention; and, Fig. 11 is an enlarged, transverse sectional view taken diametrically through the piece of work as on the line 11—11 of Fig. 10.

The present invention is applicable for use in the serrating of a surface of a part which is adapted to be arranged in abutting relation with respect to the complementarily serrated surface of another part adapted to be connected thereto. The interfitting curved serrations of the two faces in such case serve as a means for preventing relative displacement between the two parts in the plane of their mating faces except in the direction of the length of the serrations themselves. Broadly speaking, such serrated connections may be employed between any two members having abutting faces regardless of the character or construction of the members. However, one such use is in the connection between the various separately formed parts of a built-up crankshaft such as shown and claimed in United States Letters Patent No. 2,013,039, issued Sept. 3, 1935 to Julius Dusevoir. Where such serrated connections are to be employed between the various elements of a built-up machine part, such as the crankshaft disclosed in said United States Letters Patent above identified, it is essential in obtaining the desired final result that the serrations on opposed faces of such element be accurately formed, and where one or more of the elements are to be interchangeable with other similarly formed elements it will be appreciated that a uniformity of size, contour and location of such serrations is necessary in order to obtain the desired result. The present invention provides a means by which such uniformity of result may be obtained in the desired state of accuracy and finish.

In the drawings, by way of illustration only, and as indicated in Figs. 1, 10 and 11, the piece of work there shown comprises a shaft section or other cylindrical piece of work 20 having an end face arranged in perpendicular relationship with respect to its axis. As best brought out in Figs. 10 and 11 which show such piece of work 20 with its end surface in finished serrated condition, such end face is provided with a multiplicity of parallel serrations 24 thereon, such serrations being of curved conformation struck from a common center outside of the periphery of the piece of work and, of course, of uniform size throughout. While in the broader aspects of the invention the particular cross-sectional contour of the serrations 24 may vary considerably as long as such contour is such as to permit the serrations on a pair of members to be connected thereby to be readily interfitted by engagement of and disconnected from each other through separation thereof, the serrated faces, for the purpose of illustration the serrations 24, as best brought out in Fig. 11, are of triangular section having straight sides all disposed at equal angles with respect to the general plane of the surface on which they are formed.

The cutter head of the present invention may be employed with any suitable machine tool that is provided with a rotatable spindle and a support, that may be moved relative to each other in the general direction of the axis of the spindle. An ordinary lathe is illustrative of this type of machine tool, is satisfactory for use with the cutter head of the present invention, and is illustrated in part in Fig. 1. In that figure the bed of the lathe is indicated at 26, the head stock at 28 and the spindle at 30. The usual carriage 32 is illustrated as of a conventional type movable in a direction parallel with the axis of the spindle 30 upon the ways 34. The usual cross-slide on the carriage 32 is replaced by a cross-slide 36 of greater dimensions axially of the spindle 30 than the conventional slide and on its upper surface is supported a pair of spaced V-blocks 38 and 40 and which serve to support the work 20 with its axis in parallelism with the axis of the spindle 30. Suitable clamping mechanism indicated generally at 42 is associated with the V-block 38 for securing the work 20 rigidly in place during the machining operation and, if desired, similar clamping mechanism may be employed in connection with the V-block 40.

The cutter head of the present invention is mounted upon the spindle 30 in a conventional manner for operation upon the lefthand end face of the work 20 as viewed in Fig. 1. This cutter head comprises a cylindrical supporting or cutter head 50 having a concentric hub 52 concentrically mounted upon the outer end of the spindle 30 in accordance with conventional practice. It may be conveniently formed of a casting or forging. The head 50 supports one or more, and preferably a plurality as shown, radially disposed cutting elements or blades, indicated generally at 54, which are exposed on its operative end face, the righthand face as viewed in Fig. 1, for engagement with the work 20. The cutter blades or elements 54 as brought out in the various views are each of generally cylindrical character having reduced concentric cylindrical inner ends 56 and outer ends 58. In accordance with the present invention the cylindrical main body portion of each cutter element or blade 54 is provided on its surface with a plurality of equally spaced grooves forming between them ribs 60 extending in a generally circumferential direction with respect thereto. In the broader aspects of the invention the ribs 60 may comprise a plurality of separate ribs each arranged in a plane perpendicular to the axis of the associated cutter element or blade 54, or they may comprise a continuous thread-like rib. This latter form is preferable for the reason that it is more easily and accurately formed than the first type and, accordingly, this form of rib is illustrated in the drawings. The ribs 60 are of a cross-sectional configuration complementary to the cross-sectional configuration of the serrations 24 desired in the work and, accordingly, with the cross-sectional configuration of the serrations 24 assumed for the purpose of illustration, the cross-sectional configuration of the ribs 60 is, of course, triangular.

In order to provide a cutting edge for each cutter element or blade 54, the main body portion on each cutter element or blade 54 is provided in its outer surface with an axially parallel groove or recess 62 each side wall of which preferably lies in a plane including the axis of the corresponding cutter element or blade 54. At least that side wall thereof which is to form the cutting edge 64 of the cutter element or blade is so disposed as to intersect the ribbed periphery of the main body portion along an approximate line parallel to the axis of the cutter element or blade so as to form the cutting edge 64. The cutting edge 64 is, therefore, of serrated or irregular conformation in face view complementary to the cross-sectional configuration of the serrations 24 desired to be formed on the work.

In order to receive the cutter elements or blades 54, the head 50 is provided in its operative end with a like member preferably equally angularly spaced partially cylindrical recesses for reception thereof. The recesses are of such depth as to expose a portion of each cutter element or blade 54 axially outwardly beyond the operative end face of the head 50 and each cutter blade or element 54 is so positioned in its corresponding recess that its cutting edge 64 thereof is exposed axially outwardly beyond such operative end face of the head 50. These recesses are, furthermore, arranged with their axes radial with respect to the axis of rotation of the head 50 so that the cutting edges 64 of the blades 54 may be disposed in radial relation with respect to the axis of rotation of the head 50. Each recess comprises a central partially cylindrical portion 70, best brought out in Figs 4, 5 and 6 of a radius substantially equal to the radius of the main body portion of the corresponding cutter element 60 so that the latter is relatively closely received therein, and partially cylindrical concentric end portions for relatively closely receiving the end portions 56 and 58 of the cutter blades or elements 54 as particularly brought out in Figs. 7 and 3, respectively. The length of the portion 70 of each recess is preferably slightly greater than the length of the main body portion of the cutter blade or element 54 received therein for a purpose which will hereinafter be brought out.

The forward wall, in the normal direction of rotation of the head 50, of each recess is cut away as indicated at 71 in Figs. 5 and 6 to provide an opening on the operative end face of the head 50 leading into each recess of sufficient width to pass the diameter of the cutter blades or elements 60 therethrough to thus permit the insertion and removal of the cutter blades into and out of the corresponding recesses.

The operative end face of the cutter head 50 is centrally cut away for complementary reception of a plate member 72. The plate member 72 is formed to provide a central cylindrical boss portion 72a and an overhanging flange portion 72b extending radially outwardly therebeyond. Screws 76 projected through the plate member 72 and threaded into the head 50 serve to secure the plate member 72 in place. The overhanging flange portion 72b of the plate member 72 is provided with a notch 96 in its periphery at the inner end of each cutter blade or element 54, and that side of each of said notches more advanced in the direction of normal turning movement of the cutter head is radially disposed with respect to the axis of rotation of the cutter head and is aligned axially of the cutter head with the axis of the cooperating cutter blade 54. The notches 96 extend radially inwardly of the member 72 to the cylindrical portion 72a thereof and the cutter blades 54 stop short of such portion 72a so that only the unnotched portion of the flange portion 72b overlaps the inner ends of the cutter blades 54 and then only over those portions thereof in which the grooves 62 are located.

In centrally cutting away the operative end face of the head 50 for reception of the plate member 72, it is cut away to such a depth that the axially inner face of the flange portion 72b lies in the plane of the axes of the cutter blades or elements 54, as best brought out in Figs. 6 and 8, and in which position the axially outer face of the plate member may project slightly outwardly beyond the operative end face of the head 50. As best brought out in Fig. 6, those portions of the flange 72b which overlap the inner ends of the cutter blades or elements 54 are cut away for complementary reception in the inner ends of the grooves 70 and the bottoms of the grooves 62 in the cutter blades or elements 54, and the plate member 72 thus serves as a clamp to maintain the inner ends of the cutter blades or elements in the bottom of their corresponding grooves 70. It will be observed from an inspection of Fig. 6 that the radial wall of each notch 96 abuts against the outermost and radially disposed wall of the groove 62 in the corresponding cutter blade or element 54 and thus serves as a stop in engagement with such wall of the groove 62 positively preventing further rotation of the cutter blade or element 54 in a counterclockwise direction of rotation about its own axis, as viewed in Fig. 6. This feature serves as a means for locating the cutting edge of each cutter blade or element 54 in radial relation with respect to the axis of rotation of the head 50 as will hereinafter be more apparent.

As indicated best in Figs. 2 and 3 the operative end face of the cutter head 50 is also axially cut away as at 78 adjacent the outer end of each cutter blade receiving recess to a depth equal to the radius of the outer ends 58 of each cutter blade or element, and a clamping member 80 is received in each recess 78 with its outer surface in substantially flush relationship with respect to the operative end face of the head 50 and with one end thereof shaped to correspond to and arranged in complementary engagement with the outer surface of the corresponding reduced end portion 58. The clamping members 80 are each drawn into position by means of a screw 82 projected therethrough and threaded into the head 50 as indicated best in Fig. 3.

It will be appreciated that when the cutter head is rotating during a cutting operation, the cutting edge 64 in engaging and removing metal from a piece of work will be subjected to a force tending to turn the cutter blade in a clockwise direction of rotation as viewed in Figs. 4, 5 and 6, and that the clamping action of the plate 72 on the inner ends 56 of the various cutter blades and the clamps 80 on the outer ends 58 of the various cutter blades would probably be insufficient to maintain the rotatable positions of the cutter blades about their own axes particularly during a heavy cutting operation. To overcome the possibility of such movement of the cutter blades or elements 54 under such conditions an elongated strip of metal or key 90, best shown in Figs. 4, 5 and 6, is positioned in that side of the grooves 62 of each cutter blade opposite the cutting edge 64 thereof. Each key 90 is preferably shaped to fit the bottom of the corresponding recess 62 and the associated end wall thereof and is of a thickness equal to the depth of the associated groove 62 so as to enable it to be moved, if necessary, with its blade 54 into the cylindrical portion of the corresponding recess 70. The keys 90 extend over the length of the portion 70 of each blade receiving recess and are of such dimensions circumferentially of the blades that their outer edges are positioned inwardly of the plane of the outer operative end face of the cutter head 50.

A plurality of screws 92 are threaded into the end face of the head 50 in axially parallel relation with respect thereto in such position that the heads thereof overlap the outer edges of the keys 90, as indicated in Figs. 2 and 4, so as to act through the keys 90 to lock the corresponding cutter blades or elements 54 against rotation in a clockwise direction in their corresponding recesses as viewed in Figs. 4, 5 and 6. The outer end face of the head 50 is preferably recessed as at 94 for reception of the heads of the screws 92 so as to enable such heads to be arranged in at least flush relation with respect to the operative end face of the head 50. It will, of course, be appreciated that by threading the various screws 92 inwardly from the position indicated in Fig. 4 that they may act through their corresponding keys 90 to tend to rotate the corresponding cutter blades 54 in a counterclockwise direction of rotation as viewed in Fig. 4. By means of the keys 90 and screws 92 the various cutter blades or elements 54 are, therefore, firmly anchored against rotation in the head 50 under the force of a cutting operation. In drawing down the various screws 92 the cutter blades 54 are rotated until the clockwise wall of the grooves 62 thereof, as viewed in Figs. 4, 5 and 6, engage the radially extending edge of the corresponding notches 96 which thus automatically locates the cutting edges of the blades in their desired radial relation with respect to the axis of rotation of the cutter head.

In employing the cutter head thus described in forming the serrations 24 on the end of the piece of work 20 it will be appreciated that the cutter head is caused to rotate and the carriage 32 is operated to move the left-hand end of the work 20 as viewed in Fig. 1 to the left as viewed in Fig. 1 so that such end is brought into a position to be successively engaged by the cutting edges 64 of the various blades 54 to remove metal therefrom in complementary relationship with respect to the serrations desired. As will be appreciated from an inspection of Fig. 10 which indicates that the serrations 24 are all struck from a center outside of the periphery of the work 20, the work 20 will necessarily be positioned with its axis eccentric to the axis of rotation of the head 50 during this machining operation.

It will also be appreciated that the high points of the serrated cutting edge 64 of each blade 54 will have to be in circumferential alignment about the axis of rotation of the head 50 with the corresponding high points of the serrated cutting edges of the remaining blades 64. In order to insure such circumferential alignment of the high points of the cutting edges 64 of the various blades 54 the following described mechanism is employed. As indicated best in Figs. 2 and 8 the operative axial end face of the head 50 is provided with a circular and concentric groove 100 therein. Substantially filling the groove 100 between each adjacent pair of cutter blades 54 are a pair of segmental locating members 102 and 104 slidable relative to each other in the groove 100. The segments 102 and 104 are provided with slots 106 therein, elongated in the direction of length of the segments, and through which bolts or screws 108 are projected and threaded into the head 50 for the purpose of clamping the segments in circumferentially adjusted position.

As best brought out in Figs. 2 and 5 the corresponding ends of each pair of segments 102 and 104 are serrated for complementary engagement with the ribbed or threaded surface of the associated cutter blade 54, but as particularly brought out in Figs. 2 and 9 the serrations on the end of the segments 102 are so radially offset from the serrations on the ends of the segments 104 that when the high points of the serrations of one segment are interfitted in the bottoms of the grooves or received midway between the ribs 60 of the cooperating cutter blade 54, the high points of the serrations of the other segment are centrally aligned with such ribs 60. Consequently when the high points of the serrations of a segment 104 are received in the bottoms of the grooves formed between the ribs on a cutter blade 54 the high points of the serration of the associated segment 102 are in opposed relation with respect to the tops of the ribs 60 of the associated cutter blades. The serrated ends of all of the segments 102 are arranged with the high points of the serrations at corresponding distances from the axis of rotation of the head 50 and the high points of the serrations on all of the segments 104 are likewise arranged with such high points at corresponding distances from the axis of rotation of the head 50. Consequently when the cutter head is set up for a cutting operation, in order to insure that the high points of the serrations of the various cutting edges 60 of the cutter blades 64 are arranged at corresponding radial distances from the axis of rotation of the cutter head, before the various cutter blades 54 are clamped in position, either one set or the other of the segments 102 and 104, shown in Fig. 2 as the segments 104, are slid circumferentially in the groove 100 until the serrated ends thereof are in accurately intermeshed relation with respect to the ribbed exterior of the associated cutter blades 54, the cutter blades 54 being adjusted axially thereof in their associated recesses in the head 50 if necessary to bring about this relation, and then the screws 108 are tightened down. This operation acts to positively lock all of the cutter blades 54 with their serrated cutting edges in a corresponding position radially of the axis of rotation of the cutter blades. The cutter blades are then clamped in position and the cutting operation is performed with the assurance that the high points of the serrations of the cutting edges 60 of all the cutter blades 54 will be circumferentially aligned with each other and the serrations 24 formed on the work 20 will be of true and accurate conformation.

It will be appreciated that if two cylindrical pieces of work, such as the workpiece 20 illustrated, or equivalent pieces of work, are supported in the same position in the lathe shown and are serrated with the same positioning of the cutter blades 54, when the two pieces of work are positioned with their serrated faces in contact the serrations of both pieces cannot be arranged in interfitting relation with respect to each other. This is because the high points of the serrations on one of the pieces must fit within the low points of the serrations of the other of the pieces in order to effect a perfect interfitting relationship, requiring the high points of the serrations of one piece to correspond in curvature to the low points of the serrations of the other piece, whereas, under the conditions assumed, the high points of the serrations on both pieces are struck from equivalent centers. Accordingly, in order to have the serrations of one of the pieces accurately interfit with the serrations of the other of the pieces when such pieces are arranged in end-to-end relationship, it is necessary that the serrations of one piece be offset from the serrations of the other piece about a common center for all of the serrations by a distance equal to half the pitch of, or distance between, these serrations.

In order to permit this desired arrangement of interfitting serrations to result by the use of the cutter head shown and described, after one of the pieces has been machined in accordance with the method above described and with the cutter blades 54 positioned as indicated in Fig. 2, the blades 54 are loosened in their respective recesses in the head 50, the segments 102 and 104 are loosened in the groove 100 by loosening of the screws 108, the segments 104 are backed out of engagement with their corresponding cutter blades 54, and the segments 102 are moved into engagement with such cutter blades which are then shifted radially in their corresponding recesses so that the serrated ends of the segments 102 are now arranged in interfitting relationship with respect to the ribs exterior of the cutter blades 54 as indicated in Fig. 9. The segments 102 and 104 are then clamped against movement and the various blades 54 are again clamped against movement in the head 50. The cutter blades 54 by this operation have thus been shifted radially with respect to the axis of rotation of the head 50 by a distance equal to half of the pitch of, or half of the distance between the high points of, the ribs of the cutter blade 54. Consequently when another piece of work is machined with the cutter blades 54 shifted as above described and is indicated in Fig. 9, the high points of the serrations 24 thus formed upon the piece of work will be located in the same relative positions radially of the axis of rotation of the head 50 as the low points of the serrations formed on the previously machined piece of work with the previous setting of the blades 54. Consequently when this second piece of work is arranged in end-to-end and abutting relationship with respect to the serrated end of the piece of work first serrated, the serrations 24 of the two pieces will accurately and completely interfit with one another. With such arrangement of serrations on the two pieces, where the two pieces are cylindrical shafts or shaft sections, for instance, the two shafts may, as will be readily appreciated, be arranged in concentric relation with respect to each other and with the serrations of both pieces accurately interfitting one another so that, while the serrations of the two pieces are maintained in interfitting relationship, relative movement between the abutting faces of the two pieces in the plane of abutment is positively prohibited excepting only in the direction of length of the serrations.

One of the principal advantages of the construction above described is the long life of the cutter blades 54. Where the cutting edges 64 of such blades become worn or dull the various blades 54 may be removed and that face of the grooves 62 of each thereof cooperating with the periphery of the cutter blades to form the cutting edge 64 may be ground away in a manner which simply widens the slot 62, to form a new cutting edge. The cutter blades 54 may then be replaced in the head 50 and in tightening down the screws 92 the new cutting edge will be brought into true radial relation with respect to the axis of rotation of the cutter head in the same manner as previously described. In this connection it will be noted that the recesses 94 for the heads of the screws 92 are made considerably deeper than the thickness of the heads of these screws so as to permit them to rotate the cutter blades 54 through a distance initially much greater than that required to bring the edge of the slots 62 mentioned into contact with the radially disposed wall of the corresponding notch 96 in the plate 72 and which, as previously mentioned, serves to locate the cutting edges 64 radially with respect to the rotation of the head 50. Should the re-sharpening of the blades 54 widen the slots 62 to such an extent that the heads of the screws 92 strike the bottom of their corresponding recesses 94, the keys 90 shown may be replaced with wider keys which will thereupon permit the blades to be sharpened a number of additional times before such keys are again required to be replaced with wider keys. Having the above in mind it will be appreciated that each cutter blade 54 may be resharpened a great many times before its area of contact with the walls of the recesses 70 is reduced to such an extent as to render it inadvisable to attempt any further sharpening of the blades.

Having thus described my invention what I claim by Letters Patent is:

What is claimed is:

1. A cutting tool comprising, in combination, a rotatable head having an axial end face and a radially disposed recess in said face arranged with its center line substantially in a plane perpendicular to the axis of rotation of said head, a cutting element rotatably mounted in said recess, said cutting element having a cutting edge in substantial parallelism with the axis of rotation thereof in said head, and means releasably clamping said element against rotational movement in said recess.

2. A cutting tool comprising, in combination, a rotatable head having an axially exposed face provided with a generally radially disposed recess opening thereonto, said recess being arranged with its center line substantially in a plane perpendicular to the axis of said head, a cutting element received in said recess, said cutting element comprising a generally circular member, a plurality of ribs formed integrally with and extending about said member in axially spaced relation with respect to each other axially of said member, said member being longitudinally grooved whereby to present said ribs in cross-sectional configuration to provide a cutting edge in substantial parallelism with the axis thereof, said member being positioned in said recess with said cutting edge thereof exposed axially outwardly beyond and in substantial parallelism with said axial face of said head, and means releasably clamping said member against movement in said recess.

3. A cutting tool comprising, in combination, a rotatable head having an axial end face, a generally cylindrical cutting element extending radially with respect to said face, ribs on the exterior surface of said element spaced from one another axially of said element and extending in a generally circumferential direction thereabout, said element being longitudinally grooved whereby to provide a cutting face presenting said ribs in sectional configuration to provide a serrated cutting edge, means mounting said cutting element on said head for adjusting movement about the axis of said element, and means for locking said element in rotatably adjusted position about its axis with said cutting edge thereof exposed axially outwardly beyond said end face of said head and in substantial parallel relation to the plane thereof.

4. In a cutting tool in combination, a rotatable supporting head having an axial end face, a plurality of radially disposed angularly spaced cutting elements arranged with their axes parallel to and segmentally exposed on said face, each of said cutting elements comprising a member having an externally ribbed generally cylindrical body portion and each being longitudinally grooved to provide a cutting surface intersecting said ribs to form a serrated cutting edge projecting outwardly beyond and substantially parallel to said face, means cooperating with said elements locating said cutting edge of each of said elements in radial relation with respect to the axis of rotation of said head, and means releasably securing said elements against movement in said head.

5. A cutting tool comprising, in combination, a rotatable head having an axial end face provided with a plurality of radially disposed recesses therein in parallel relation with respect to said face, a cutting element received in each of said recesses and projecting axially outwardly beyond said end face, each of said cutting elements being adjustable about its axis in said head, ribs formed integrally with each of said elements encircling the same in spaced relation to each other axially thereof, said elements each being longitudinally grooved whereby to present a cutting face intersecting said ribs thereon to provide a serrated cutting edge, means cooperating with said cutting face of each of said elements operable to locate said cutting edge of each of said elements radially with respect to the axis of rotation of said head and in outwardly spaced and parallel relation with respect to said face, and releasable means for securing said elements against movement in said head.

6. A cutting tool comprising, in combination, a rotatable head having an axially exposed end face provided with a plurality of radially disposed cutting element receiving recesses therein, a cutting element received in each of these said recesses and each comprising a generally cylindrical member arranged with its axis substantially parallel to said face and having a grooved peripheral surface with the grooves thereof spaced from each other axially of said member, each of said members having a longitudinally extending groove in the peripheral surface thereof one side wall of which serves to provide a cutting face intersecting said grooved peripheral surface of said member to provide a serrated cutting edge, said members being arranged in their respective recesses to present said cutting edges thereof axially outwardly beyond and parallel to said end face of said head, and means cooperating between said head and that wall of the groove of each of said members opposite said cutting face thereof for holding said members against rotation in their recesses under the force of a cutting operation.

7. A cutting tool comprising, in combination, a rotatable head having an axially disposed face provided with generally radially disposed recesses therein in parallel relation with respect to said face, a cutting element received in each of said recesses with a segment of each projecting outwardly therefrom axially beyond said axial face of said head, each of said cutting elements comprising a member having a generally cylindrical threaded surface, each of said members being longitudinally grooved whereby a side wall of said groove forms a cutting face intersecting said threaded portion of said member to form a serrated cutting edge in generally parallel relation to the axis thereof, said members being rotatably adjustable in said recesses about their axes and being adjusted to position said cutting edges thereof at the position of maximum projection outwardly beyond said end face of said head, and means for releasably securing said members against movement in said recesses.

8. A cutting tool comprising, in combination, a rotatable head having an axially disposed end face provided with a plurality of angularly spaced generally radially disposed recesses therein, a cutter member removably received in each of said recesses and including a generally cylindrical main body portion having a generally circumferentially grooved peripheral surface, each of said cutter members being longitudinally grooved whereby one side of said groove serves to form a cutting surface intersecting the grooved peripheral surface of said member to form a serrated cutting edge, means cooperating with said side of said groove of each of said members forming said cutting surface for locating said cutting edge of each of said members in a predetermined relation with respect to said head, and means cooperating between the remaining side wall of the groove of each of said members and said head serving to resist rotational movement of said member under the force of a cutting operation.

9. In a cutting tool, in combination, a rotatable head having an axially exposed end face provided with a plurality of angularly spaced generally radially disposed recesses opening thereonto, a cutter member removably received in each of said recesses, each of said cutter members comprising a generally cylindrical main body portion and reduced concentric end portions, said main body portion of each of said cutter members projecting from said recess axially outwardly beyond said end face and its periphery being grooved, each of said cutter members having a longitudinally extending groove in said main body portion thereof whereby to provide a cutting face intersecting the grooved periphery of said main body portion to provide a serrated cutting edge, said cutter members each being rotatably adjusted about its axis in its corresponding recess to bring said cutting edge thereof at a position of maximum distance outwardly of said end face of said head, and means cooperating with said reduced ends of each of said cutter members for removably securing said cutter members in said head.

10. In a cutting tool, in combination, a rotatable head having an axially exposed end face provided with a plurality of angularly spaced generally radially disposed recesses opening thereonto, a cutter member removably received in each of said recesses, each of said cutter members comprising a generally cylindrical main body portion and reduced concentric end portions, said main body portion of each of said cutter members projecting from said recess axially outwardly beyond said end face and its periphery being grooved, each of said cutter members having a longitudinally extending groove in said main body portion thereof whereby to provide a cutting face intersecting the grooved periphery of said main body portion to provide a serrated cutting edge, said cutter members each being rotatably adjusted about its axis in its corresponding recess to bring said cutting edge thereof at a position of maximum distance axially outwardly of said end face of said head, means cooperating with the reduced radially outer ends of each of said members and means cooperating with the reduced radially inner ends of each of said members for retaining said members in said recesses, and means fixed with respect to the last mentioned means cooperating with said cutting surface of each of said cutter members for locating said cutting edges thereof in predetermined relation with respect to said head.

11. In a cutting tool, in combination, a rotatable head having an axially exposed end face provided with a plurality of angularly spaced generally radially disposed recesses opening thereonto, a cutter member removably received in each of said recess, each of said cutter members comprising a generally cylindrical main body portion and reduced concentric end portions, said main body portion of each of said cutter members projecting from said recess axially outwardly beyond said end face and its periphery being grooved, each of said cutter members having a longitudinally extending groove in said main body portion thereof whereby to provide a cutting face intersecting the grooved periphery of said main body portion to provide a serrated cutting edge, said cutter members each being rotatably adjusted about its axis in its corresponding recess to bring said cutting edge thereof at a position of maximum distance axially outwardly of said end face of said head, means cooperating with the reduced radially outer end of each of said cutter members and means cooperating with the reduced radially inner end of each of said cutter members for removably securing said cutter members in said head, the last mentioned means comprising a member cooperating with all of said cutter members and including portions overlying said reduced radially inner ends only thereof and other portions overlying a portion of said main body portion of each of said cutter members and receivable in said groove thereof.

12. A cutting tool comprising, in combination, a rotatable head having an axially disposed end face provided with a plurality of angularly spaced recesses opening thereonto, a cutting element removably received in each of said recesses and having a limited amount of endwise movement therein, each of said cutting elements having a grooved surface and a cutting face cooperating therewith to provide a serrated cutting edge, a pair of relatively movable locating elements mounted on said head in adjacent relationship to each of said cutting elements for movement toward and away from the corresponding cutting elements in a direction transverse to the length thereof, each of said cutting elements having an end serrated for complementary engagement with the grooved surface of the corresponding of said cutting members, the serrations on the ends of each pair of said locating elements being so constructed and arranged that each requires a different axial position of the associated cutting element to permit its serrated end to be complementarily engaged therewith, the serrated ends of corresponding of said elements being simultaneously engaged with said cutting elements thereby to locate all of said cutting elements with the grooves thereof at corresponding distances from the axis of rotation of said head, and means for releasably locking said locating elements in slidably adjusted position.

13. A cutting tool comprising, in combination, a rotatable head having an axially exposed end face provided with a plurality of generally radially disposed angularly spaced recesses therein, a generally cylindrical cutting element removably received in each said recesses and having a grooved peripheral surface, each of said cutting elements being longitudinally grooved whereby to provide a radially disposed cutting face intersecting said grooved perpiheral surface to provide a serrated cutting edge, said head having a circular groove in said end face thereof in concentric relation with respect to the axis of rotation thereof, a pair of segments received in said groove between each adjacent pair of said cutting elements, said segments being slidable relative to each other in said groove, means for releasably locking said segments in slidably adjusted position in said groove, said groove intersecting said recesses and one end of each of said segments being serrated for complementary engagement with said grooved exterior surface of the cooperating of said cutting elements, the serrations on the end of one segment of each of said pairs of segments being out of phase with the serrations on the other of said segments of each pair of said segments whereby the serrated end of only one of each pair of segments may be fully interengaged with the grooved exterior surface of the associated of said cutting elements at any one time, said cutting elements being adjustable axially in their corresponding of said recesses whereby to enable them to be positioned for complementary engagement with the serrated end of either of the associated pair of said segments, and means for holding said cutting elements against relative rotation about their own axes.

RENÉ H. TOUBHANS.